US00RE44491E

(19) United States
(12) Reissued Patent
Shendon et al.

(10) Patent Number: US RE44,491 E
(45) Date of Reissued Patent: Sep. 10, 2013

(54) CHEMICAL MECHANICAL POLISHING RETAINING RING

(75) Inventors: Norman Shendon, San Carlos, CA (US); Michael T. Sherwood, Agoura, CA (US); Harry Q. Lee, Los Altos, CA (US)

(73) Assignee: Applied Materials, Inc., Santa Clara, CA (US)

(21) Appl. No.: 11/400,763

(22) Filed: Apr. 6, 2006

Related U.S. Patent Documents

Reissue of:
(64) Patent No.: 6,716,094
Issued: Apr. 6, 2004
Appl. No.: 10/117,892
Filed: Apr. 5, 2002

U.S. Applications:
(63) Continuation of application No. 09/892,143, filed on Jun. 25, 2001, now Pat. No. 6,443,824, which is a continuation of application No. 09/406,027, filed on Sep. 27, 1999, now Pat. No. 6,290,577, which is a continuation of application No. 08/488,921, filed on Jun. 9, 1995, now Pat. No. 6,024,630.

(51) Int. Cl.
*B24B 7/22* (2006.01)

(52) U.S. Cl.
USPC ..... 451/288; 451/388; 451/289

(58) Field of Classification Search
USPC ..... 451/41, 285–289, 398, 397, 387, 451/388
See application file for complete search history.

(56) References Cited

U.S. PATENT DOCUMENTS

| | | | | |
|---|---|---|---|---|
| 4,141,180 | A * | 2/1979 | Gill et al. | 451/67 |
| 4,519,168 | A | 5/1985 | Cesna | |
| 5,205,082 | A | 4/1993 | Shendon et al. | |
| 5,329,732 | A * | 7/1994 | Karlsrud et al. | 451/289 |
| 5,423,558 | A | 6/1995 | Koeth et al. | |
| 5,443,416 | A * | 8/1995 | Volodarsky et al. | 451/388 |
| 5,527,209 | A * | 6/1996 | Volodarsky et al. | 451/388 |
| 5,584,751 | A * | 12/1996 | Kobayashi et al. | 451/288 |
| 5,605,488 | A | 2/1997 | Ohashi et al. | |
| 5,635,083 | A | 6/1997 | Breivogel et al. | |
| 5,643,053 | A | 7/1997 | Shendon | |

(Continued)

FOREIGN PATENT DOCUMENTS

| | | |
|---|---|---|
| EP | 0 747 167 A2 | 12/1996 |
| EP | 0 776 730 A | 6/1997 |

(Continued)

OTHER PUBLICATIONS

"High-Tech Resins Boost Chip Production", Machine Design, Nov. 7, 1996, pp. 52+. ["Machine Design"].

(Continued)

*Primary Examiner* — Robert Rose
(74) *Attorney, Agent, or Firm* — Fish & Richardson P.C.

(57) ABSTRACT

A chemical mechanical head includes a retaining ring to maintain a substrate beneath the mounting surface during polishing. The retaining ring has a lower portion with a bottom surface for contacting a polishing pad during polishing and made of a first material, such as plastic, and an upper portion made of a second, different material, such as metal.

25 Claims, 3 Drawing Sheets

(56) References Cited

U.S. PATENT DOCUMENTS

| | | | | |
|---|---|---|---|---|
| 5,643,061 | A | 7/1997 | Jackson et al. | |
| 5,645,474 | A | 7/1997 | Kubo et al. | |
| 5,647,789 | A | 7/1997 | Kitta et al. | |
| 5,695,392 | A | 12/1997 | Kim | |
| 5,759,918 | A * | 6/1998 | Hoshizaki et al. | 438/692 |
| 6,251,215 | B1 | 6/2001 | Zuniga et al. | |
| 6,443,824 | B2 | 9/2002 | Shendon et al. | |

FOREIGN PATENT DOCUMENTS

| | | | |
|---|---|---|---|
| EP | 0 790 100 | A1 | 8/1997 |
| GB | 2 307 342 | A | 5/1997 |
| JP | 08-011055 | | 1/1996 |
| JP | 08-039422 | | 2/1996 |
| JP | 08-229808 | | 9/1996 |

OTHER PUBLICATIONS

"Advanced Engineering Plastics for the Semiconductor Industry", DSM Engineering (Polymer Corporation), 1996. ["DSM"].

"Advanced Engineering Plastics for the Semiconductor Industry", DSM Engineering (Polymer Corporation), 1997. ["DSM"].

"SPM Purchase Orders for PPS Techtron Purchased from Laird Plastics, Invoice Copies from Laird", 1996. Laird Plastics.

"SPM's PPS Ring Sales History", Jan. 1997 thru Nov. 1999.

"Advanced Engineering Plastics for the Semiconductor Industry", DSM Engineering (Polymer Corporation) 1996. ["DSM"].

"SPM's PPS Ring Sales History", Jan. 1996 thru Nov. 1999.

* cited by examiner

CHEMICAL MECHANICAL POLISHING RETAINING RING

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of U.S. application Ser. No. 09/892,143, filed Jun. 25, 2001 *now U.S. Pat. No. 6,443, 824*, which is a continuation of U.S. application Ser. No. 09/406,027, filed Sep. 27, 1999, now U.S. Pat. No. 6,290,577, which is a continuation of U.S. application Ser. No. 08/488, 921, filed Jun. 9, 1995, now U.S. Pat. No. 6,024,630, each of which are incorporated herein by reference in their entirety.

BACKGROUND

This invention relates generally to mechanical polishing, and in particular to polishing heads used to polish generally circular semiconductor wafers in the semiconductor industry.

This invention provides improved construction and easier operability of polishing heads useful for positioning a substrate, in particular, a semiconductor substrate, on the surface of a polishing pad. Such heads also provide a controllable biasing, or loading, between the surface of the substrate and the polishing surface.

A typical substrate polishing apparatus positions a surface of a substrate against a polishing surface. Such a polishing configuration is useful for polishing the substrate after it has been sliced from a boule (single crystal), to provide smoothly planar, parallel, front and back sides thereon. It is also useful for polishing a surface of the substrate on which one or more film layers have been deposited, where polishing is used to planarize the surface of the substrate on which one or more film layers have been deposited. A slurry having both chemically reactive and abrasive components is used in conjunction with the positioning of the film layer surface against a moving polishing surface to provide the desired polishing. This is known as chemical mechanical polishing.

A typical wafer polishing apparatus employs a carrier, or polishing head, to hold the substrate and position the film layer surface of the substrate against a polishing surface. The polishing surface is typically provided by placing a large polishing pad, typically as large as one meter in diameter, on a massive rotatable platen. The platen is driven by a motor to rotate the polishing pad and thus provide relative motion between the pad and the film layer surface of the substrate. As the pad rotates, it tends to pull the substrate out of the carrier. Therefore, the carrier also typically includes a recess within which the substrate is received. This recess is commonly provided by extending a retainer downwardly from the substrate receiving surface of the carrier positioned adjacent to, and extending circumferentially around, the edge of the substrate. The apparatus also provides a means for positioning the carrier over the polishing pad and biasing the carrier towards the pad to load the substrate against the pad, and a drive means for providing rotational, vibratory or oscillatory motion to the carrier.

An example of a polishing head having a retaining ring is shown in U.S. Pat. No. 5,205,082, by Shendon et al. which discloses pressurized diaphragm arrangement which urges a wafer carrier and wafer retainer toward a polishing pad.

In some carrier head configurations, the force urging the retaining ring toward the polishing pad is dependent on the predetermined spring constant of a circular leaf spring and its compression. The spring-loaded retaining rings are subject to bending and torsional deflection due to the spring configuration which does not provide a continuous contact force but provides a series of point loads, clamping the ring to the polishing pad. The retaining ring bends and deflects because it is allowed to flex between these point loads. This flexing can cause variation in the clearance between the ring and pad which affects the depth of slurry that passes under the ring, and it also affects the pad compression adjacent to the edge of the wafer. Variations in the depth of polishing slurry and in pad compression adjacent to the edge of the wafer can cause differential polishing of the wafer to the detriment of polishing uniformity.

The object in each head configuration is to provide a fixture which will uniformly polish the wafer across its full width without unacceptable variations in the thickness of the wafer. These prior art configurations as described can introduce polishing variations due to bladder edge effects, non-uniformly distributed force pressing the wafer to the polishing pad, and retaining ring deflections which require close and frequent monitoring to assure satisfactory polishing results.

SUMMARY

This invention relates to a polishing head substrate (wafer) backing member facing the back of, and being sealed to, a substrate (wafer) being polished. The wafer is sealed to a cavity located in the member around the perimeter of the cavity and a fluid (preferably gas although it may be a liquid) pressurizes the cavity and the back of the waft against a slurry containing polishing pad.

The wafer backing member preferably includes a seal feature, e.g. an O-ring, lip seal, or other seal member which extends from the backing member adjacent to the perimeter of the backing member to form a recess between the wafer and the member to hold a fluid or gas in the recess behind the wafer to provide a uniform pressure across the surface of the wafer being pressed against the polishing pad. A gas tight bellows chamber supports the wafer backing member and urges it toward the polishing pad to provide primary loading of the substrate against the pad. When the bellows is pressurized to urge the substrate against the polishing pad, it compresses the seal. Simultaneously, the pressure in the cavity formed by the seal may be changed, to selectively vary the polishing of the substrate. The cavity may be evacuated, to urge the center of the substrate away from the pad to increase polishing at the substrate edge as compared to its center, and it may be pressurized to enable uniform loading of the substrate against the pad. The pressure in the cavity urges the substrate away from the holding member, and thereby decompresses the seal. The pressure in the cavity may be sufficiently large to separate the substrate from the seal, at which point the cavity pressure will release, or "blow-by," through the resulting gap between the substrate and the seal.

In a further aspect of the invention, a retractable and pressure extendable retaining ring assembly extends around the backing member and prevents the wafer from sliding out from below the surface of the substrate backing member. An annular ring extending bladder extends along the backside of the ring, the bladder when pressurized urges the ring against the pad. The force with which the retaining ring is clamped to the polishing pad is dependant on the gas pressure maintained in this bladder.

These inventive configurations, alone or in combination, provide several advantages. One advantage is direct control of a uniform force on the back surface of the wafer being polished within the perimeter of the seal extending between the holding member and the wafer. A pressure is uniformly maintained without the complication or edge effects of an intermediate bladder in direct contact with the substrate. Another advantage is that the total force pressing the wafer backing member toward the wafer is controlled separately by the force created by controlling the pressure within the bellows completely independent of the influence of the pressure cavity formed between the wafer and the backing member. If the force on the wafer due to the pressure behind the wafer in the wafer facing cavity exceeds the force on the seal to the wafer exerted by the pressure in the bellows then the wafer will lift away from its seal and seal blow-by will occur until equilibrium restores the seal.

The pressure within the wafer facing cavity controls the distribution pattern by which this total force is transmitted from the wafer backing member to the wafer. Providing a vacuum to the cavity can cause the center of a supported wafer to bow inward, so that only a perimeter polishing contact is achieved. In contrast, positive pressure in excess of the seal contact pressure will cause the wafer to lift off (move away from) the seal and for gas to blow-by (it cannot cause outward bowing of the substrate as the pressure at the center of the substrate can never exceed the pressure at the perimeter of the substrate), and will also cause a uniform pressure on the back of the wafer. The bowing or deflection of the wafer, if any, is controlled and limited by the pressure on the perimeter seal, so long as the internal pressure of the recess or cavity facing the wafer does not exceed the seal pressure and cause seal blow-by.

This configuration according to the invention nearly guarantees that, as long as the force provided by the backing pressure urging the wafer from the seal is maintained at or slightly below the pressure on the seal provided by the bellows, the force clamping the wafer to the polishing pad for polishing will be uniform across the area of the wafer. In reality, because it is desired to maintain a gas tight perimeter seal, in operation the pressure in the wafer facing cavity will be slightly less than the pressure at which seal blow-by occurs. Under these conditions, a slightly greater pressure will be present between the substrate and the pad at the seal location which will slightly increase the polishing (material removed) in the perimeter ring (seal) area. However, the outer three millimeters of the substrate are considered to be a non-usable handling margin and therefore slight additional polishing (material removed) in this narrow band at the edge of the substrate is not considered deleterious.

The extension and retraction of the wafer retaining ring assembly is independently controlled by the use of the continuous annular bladder positioned around the perimeter of the wafer backing member. Such a configuration can eliminate the pressure variations associated with the point contacts of springs provided to urge the ring into contact with the pad. In one configuration, one or more restoring springs are supported on a rigid portion of the retaining ring backing ring to cause the retaining ring to retract from its lowered position when the extension bladder is depressurized.

The frictional force between the seal at the perimeter of the wafer backing member is sufficient such that when the polishing head is rotated during polishing while the wafer is in contact with the polishing slurry on the polishing pad, there is sufficient frictional force that the wafer rotates with the polishing head and overcomes the resistance to rotation with the head due to the motion of the pad and the polishing media on the polishing pad.

DETAILED DESCRIPTION

Figure 1:
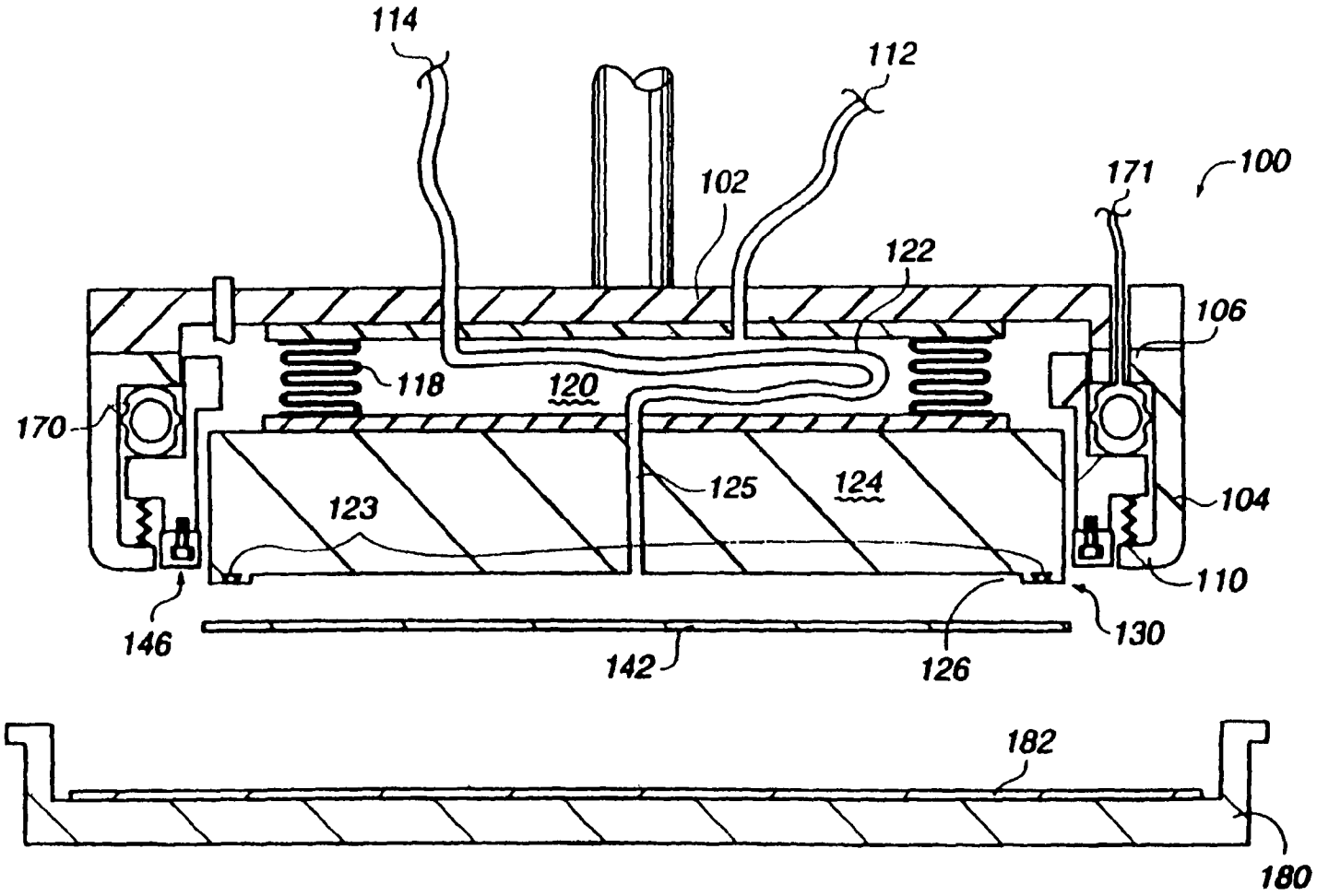
FIG. 1 shows a cross section of an embodiment according to the invention.

FIG. 1 shows a polishing head assembly 100 in a configuration according to the invention. The polishing head 100 includes a polishing head housing support plate 102 which is integral with its rod or stem support member. This support plate 102 is generally circular so as to match the circular configuration of the substrate or wafer 142 to be polished. A polishing head housing descending wall 104 is attached to the bottom of the support plate 102 by a descending wall top flange 106. The descending wall 104 includes a lower lip 110 which curves inward toward the wafer 142. The descending wall 104 encloses a wafer perimeter retaining ring assembly 146 enclosing a wafer backing member 124. The wafer backing member 124 is attached to the support plate 102 by a bellows 118 which allows a vertically variable vacuum seal. The bellows 118 encloses a bellows chamber 120. The bellows chamber 120 can be pressurized positively or negatively through a gas passage 112 to which is connected the inside of the bellows.

An Overview of the Apparatus

One typical substrate polishing apparatus generally includes a large rotating polishing pad, typically larger than, and more typically several times larger than, the surface area of the substrate being polished. Also included is a polishing head within which the substrate is mounted for positioning a surface of the substrate against the polishing surface. The head is typically supported over the pad, and fixed relative to the surface of the pad, by a support member. This support member provides a fixed bearing location from which head may extend, to provide a desired unit loading of the substrate against the pad. Loading means to enable this loading of the substrate against the polishing pad include hydraulic and pneumatic pistons which extend between the polishing head 100 and the support member (not shown). Additionally, the polishing head 100 will also typically be rotatable, which enables rotation of the substrate on the pad. Likewise, the pad is typically rotated, to provide a constantly changing surface of the pad against the substrate. This rotation is typically provided by separate electric motors (not shown) coupled to the head and a polishing platen on which the pad is received.

The polishing head 100 of the present invention provides a mechanism to position and to uniformly load the surface of the wafer 142 against a polishing pad 182 located in a stationary or rotating polishing bed 180. Generally, the polishing head 100 can be considered to comprise three systems: a loading member which supplies the downward loading of the wafer against the polishing surface; a mounting portion which allows a uniform pattern loading of the wafer against the polishing surface; and a retaining assembly which ensures that the wafer will not slip out from beneath the mounting portion during polishing operations. Each of these three members or systems provide improvements in polishing head designs, and may be used independently or in combination.

The loading member generally comprises the bellows 118 and the bellows chamber 120 provided by the attachment of the bellows to the upper surface of the backing member 124 and the interior surface of the support plate 102. By pressurizing the bellows chamber 120, force is exerted on the backing member 124, and thus on the wafer 142, to load the wafer 142 against the polishing surface of the polishing pad 182. The mounting portion includes a separate sealed pocket 123, one wall of which is firmed by the wafer, to provide an even, hydrostatic, loading across the backside of the wafer. The retaining ring assembly 146 includes an extendable retainer 162 which circumscribes the wafer 142.

The Structure of the Loading Member and the Mounting Portion

To provide the mounting portion, the backing member 124 includes a wafer facing recess 126. The perimeter of the backing member 124 is configured to receive an edge seal feature 130, e.g., an O-ring (not shown in the empty O-ring groove of FIG. 2) or other type of seal. The edge seal 130 is located and configured to engage the perimeter portion of the backside of the wafer 142 and thereby form, in combination with the recess 126, a pressurizable pocket 123. The pocket includes the recess 126 and the area within the seal 130 over the backside of the wafer. When the backing member 124 is rotated, this feature provides a frictional force between the wafer 142 and the backing member 124 so that the substrate 142 generally turns with the backing member 124.

Gas or other fluid (preferably an inert gas) is supplied to or evacuated from the pocket through a gas passage 125 which is connected through a hose 122 coiled inside the bellows 118 and supplied from a gas line 114. The selective pressurization of the pocket 123 and the bellows chamber 120 provides the loading of the wafer on the polishing pad 182. Additionally, the bellows enables the backing member 124, and thus the wafer 142, to move rotationally with respect to the support plate 102 and in the x, y, and z directions during polishing.

The bellows 118, in combination with the upper surface of the backing member 124, the lower surface of the support plate 102 and a pressure source (not shown), provide the loading member. In one mode of operation, the pressure in the bellows chamber 120 is controlled to be constant and the flexibility of the bellows 118 accommodates misalignments or changes in clearance between the backing member 124 and the surface of the polishing pad 182. The pressure in the bellows chamber 120 is selected to provide the desired loading of the wafer 142 against the polishing pad 182. In this configuration, the pressure in the bellows chamber 120 provides a regulatable uniform force pressing the backing member 124 toward the surface of the polishing pad 182 regardless of the extension of the bellows 118.

In turn, pressurizing the recess 126 behind the wafer 142 enables a uniform contact pressure to exist between the polishing pad 182 and the wafer 142 across the entire surface of the wafer contacting the polishing pad 182.

The extension or retraction of the bellows 118 is controlled by pressurizing or depressurizing the bellows chamber 120 via the gas passage 112. The pressurization or depressurization of the recess 126 in the backing member 124 either pressurizes or depressurized the pocket 123. A negative differential pressure due to vacuum bends the wafer 142 upwardly. A sufficient positive pressure creates a separating force greater than the force from the bellows 118 which forces the seal wafer.

The polishing head configuration of FIG. 1 also overcomes the comparative difficulty encountered in prior art head designs when loading and unloading the wafer from the head, and in ensuring that the wafer does not slip from beneath the backing member 124.

In the present head design, the pressure maintained in the pocket may be changed to provide a super-atmospheric pressure to separate the wafer from the carrier when polishing is completed, and to provide a vacuum pressure (preferably of up to approximately 100 torr less than atmospheric pressure) behind the wafer thereby causing atmospheric pressure to maintain the wafer on the head as the head is loaded onto the polishing pad 182.

When the wafer is attached to the backing member 124 by maintaining a vacuum in the pocket, the wafer may deflect inwardly toward the recess 126. The recess 126 is sufficiently shallow that the total possible deflection of the wafer into the recess, when considered in combination with the span of the wafer 142 across the recess 126, will impose stresses in the wafer 142 which are less than the strength or yield limits of the wafer material.

The vacuum need be maintained in the pocket only during the period of time that the polishing head is removed from the polishing pad 182. Once the polishing head and the wafer 142 are repositioned on the polishing pad 182, the pressure in the pocket is increased, until a pressure above atmospheric pressure is maintained therein. Simultaneously, the pressure in the bellows chamber 120 is increased, to provide a load force to load the wafer 142 against the polishing pad 182.

Figure 3:
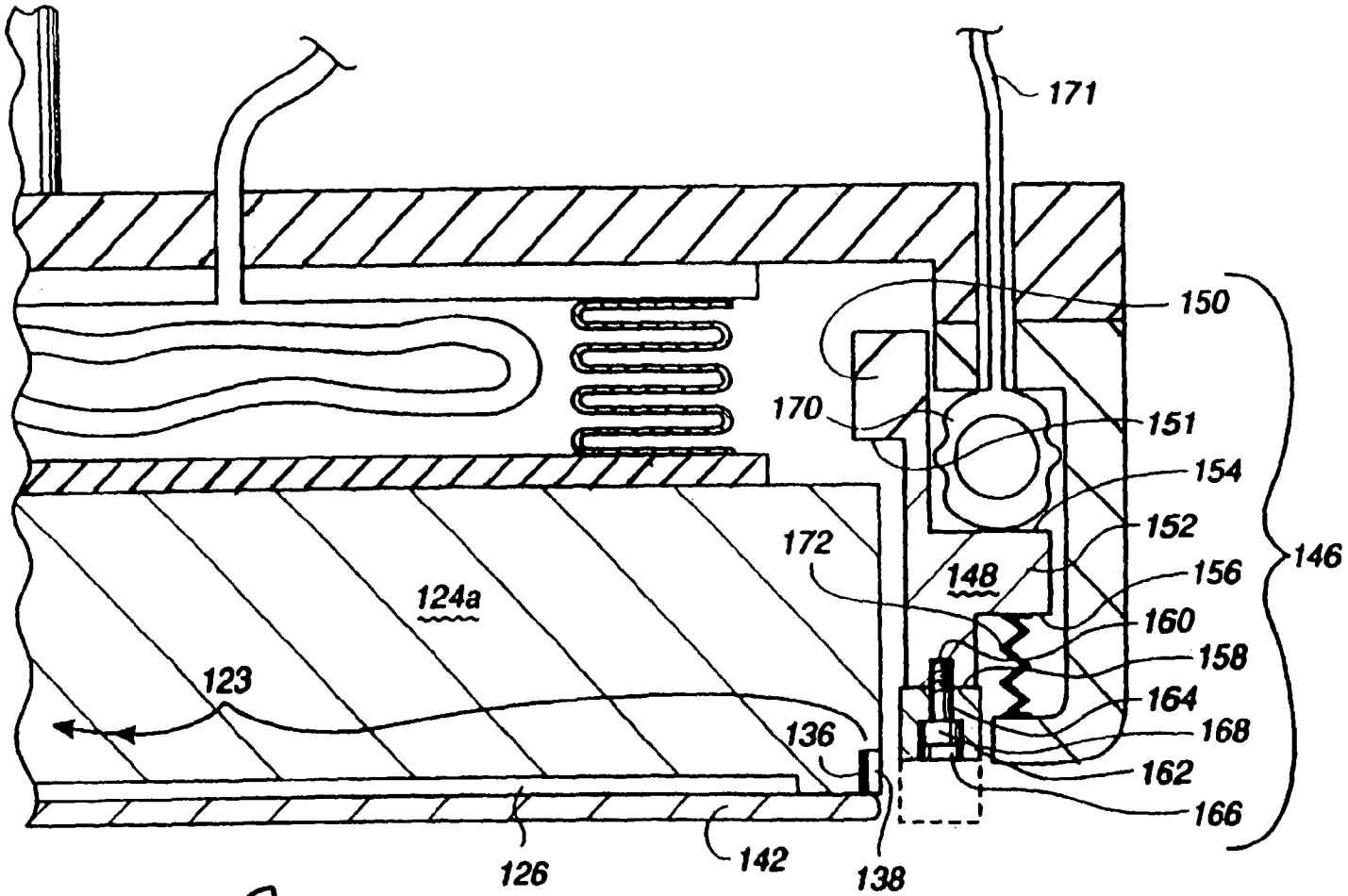
FIG. 3 is a close up view of the right side of FIG. 1 showing the periphery of the wafer backing member with a lip seal.

As the pressure in the bellows chamber 120 is increased, it loads the seal 130 received in the backing member 124 into contact with the backside of the wafer. The seal will compress under this load, which will enhance the sealing characteristics of the seal 130. Therefore, as the pressure in the bellows chamber 120 increases, the threshold pressure at which gas maintained in the pocket 123 will leak past, or "blow-by", the seal 130, also increases. Blow-by occurs when the head and the seal lift off the wafer. This condition occurs when the pressure in the pocket, when multiplied by the surface area of the wafer 142 circumscribed by the seal 130, exceeds the load force on the seal-wafer interface. In the configuration of the head, as shown in FIG. 3, the area of the backing member 124 which is circumscribed by the bellows 118 is smaller than the area of the wafer 142 circumscribed by the seal 130. Therefore, the pressure in the bellows cavity must exceed the pressure maintained in the pocket to prevent blow-by.

Preferably, the pressure maintained in the pocket is approximately 75 torr less than the threshold at which blow-by will occur. At these pressures, the entire backside of the wafer, less a very small annular area outward of the seal 130, will have a uniform pressure on the back surface thereof which ensures that the front surface of the wafer is uniformly loaded against the polishing pad 182. However, it is specifically contemplated, although not preferred, that higher pressures, including a pressure at or above blow-by, may be used. Where such higher pressures are used, the seal-wafer interface will serve as a relief valve, and blow-by will occur periodically to maintain a desired pressure within the pocket 123.

Figure 2:
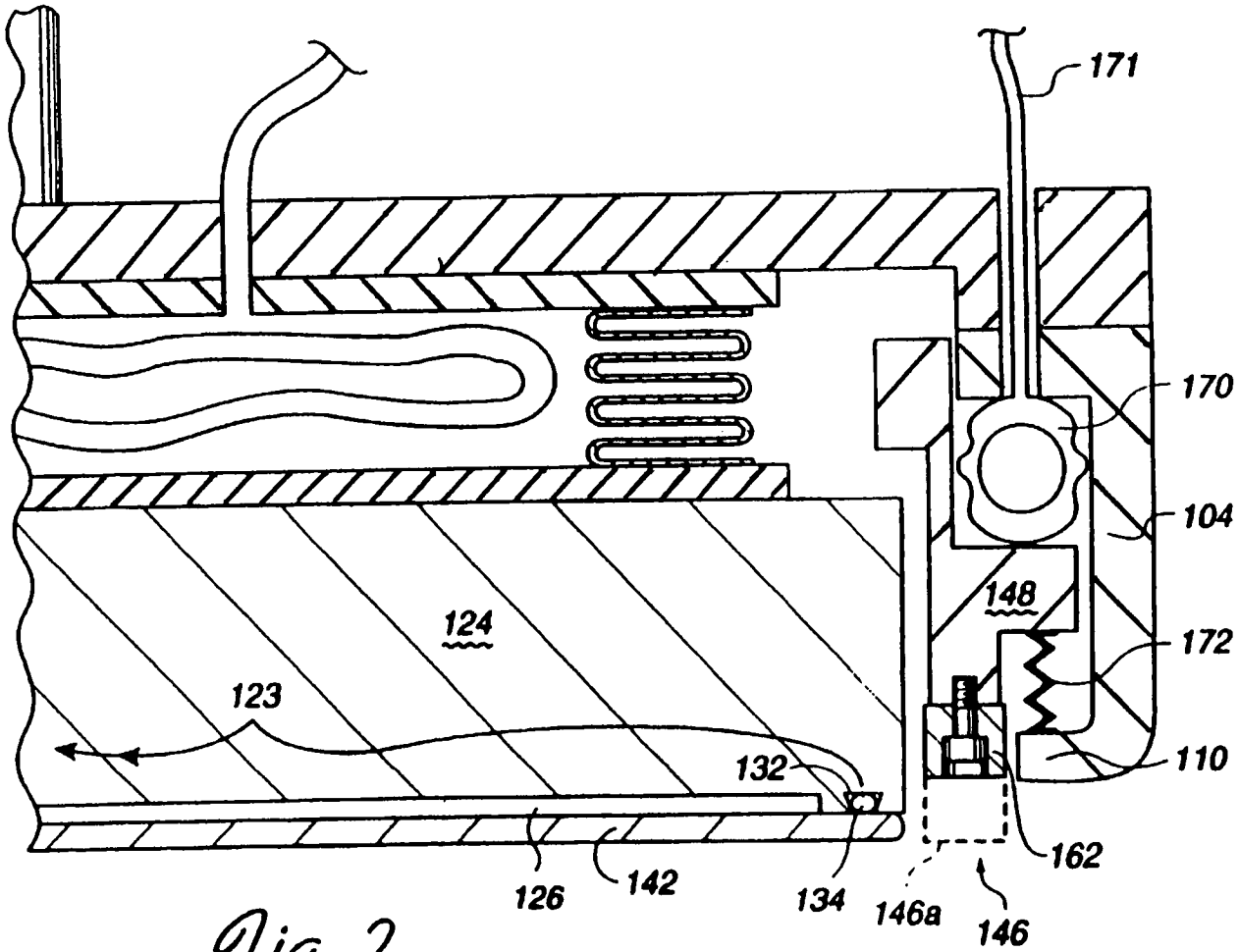
FIG. 2 is a close up view of the right side of FIG. 1 showing the periphery of the wafer backing member with an O-ring seal.

FIG. 2 shows a close up of the right side of the polishing head of FIG. 1. The seal 130 in this configuration is an O-ring 134 located in an O-ring groove 132 (i.e., collectively: an annular extending portion). This seal is located at the perimeter of the wafer 142 surrounding the recess 126 (and the associated pocket). The perimeter of the backing member 124 is surrounded by the retaining ring assembly 146. The retaining ring *assembly 146* includes a [the] retaining ring 162 which is attached to [the] *a* backing ring 148. A series of compression springs 172 (i.e., first set of elastic members)

support the backing ring 148 on the lip 110 of the descending wall 104. An expandable retaining ring extending bladder 170 can be pressurized through gas supply passage 171 (i.e., a second set of elastic members). When bladder 170 is pressurized, the retaining ring assembly 146 is extended to a location adjacent the wafer 142 as shown by the dashed lines 146a in FIG. 2.

A second configuration of the polishing head of the present invention is shown in FIG. 3, wherein the seal 130 is a downwardly extending lip seal 136 received on the outer perimeter of the backing member 124, and secured thereon by a backing ring 138 extending about the outer circumference of the lip seal 36. The lip seal 136 is preferably a thin, elastic, member having a rectangular cross section. A portion of the lip seal 136 extends from the underside, or wafer engaging side, of the backing member 124, to engage the upper surface of the wafer 142 immediately inwardly of the perimeter of the wafer 142. As with the O-ring 134, the engagement of the lip seal 136 with the wafer forms a pocket (including wafer recess 126 and a shoulder area inside lip seal) which may be evacuated or pressurized. The lip seal 136 and the O-ring 134 provide sufficient contact between the surface of the substrate and the surface of the seal to create a rotational force due to friction between the two to keep them in contact so that the substrate turns with the polishing head.

The Retaining Ring

Referring again to FIG. 1, the polishing head 100 also includes a retaining ring assembly 146 to ensure that the wafer 142 does not slip out from beneath the head during polishing operations. The retaining ring 162 has through holes 164 and counterbores 166 therein (FIG. 3). Retaining ring screws 168 are placed therethrough and threaded into a series of backing-ring bottom-surface threaded holes 160 to hold the retaining ring 162 to a backing ring 148. The retaining ring 162 is preferable made of Delrin or similar plastic material. The backing ring 148 is preferably made of aluminum as are all of the other metal pieces except for the bellows which is stainless steel. The backing ring 148 has a bottom surface 158 facing the retaining ring 162. The backing ring 148 includes an outside flange 152 having a top face 154 facing the bladder 170 and a bottom face 156 facing the series of compression springs 172. The backing ring 148 has an inside flange 150 having a lower face 151 which extends inwardly over the diameter of the retaining member 124a such that when the backing member 124a is raised beyond a certain point the [backing] *retaining* ring assembly 146 also rises.

FIGS. 2 and 3 show details of the retaining ring assembly 146. The backing ring 148 is urged upwardly away from the lip 110 of the descending wall 104 by a plurality of (for example 6-12) compression springs 172. When the bladder 170 is pressurized to extend the retaining ring assembly 146 to its operating position as shown by the dashed lines 146a in FIG. 2, the retaining ring 162 surrounds the edge of the wafer being polished. This prevents the wafer from sliding out under the wafer backing member 124, or 124a. Inflation of the bladder 170 through the gas passage 171 provides a downward force to oppose the compression springs 172 and forces the retaining ring 162 toward and possibly against the polishing pad 182. A continuous continuously pressurized bladder could be employed to replace the series of springs 172 to provide uniformly distributed retracting forces.

The lower surface 151 of the backing ring inside flange 150 is configured so that as the plastic Delrin material of the wafer perimeter retaining ring 162 wears away, the travel of retaining ring is limited by the interference between the lower surface 151 of the upper flange 150 and the top of the wafer backing member 124a so that the head of the retaining ring retaining screws 168 cannot touch the polishing pad. This prevents the heads of retaining screws 168 from coming in contact with the polishing pad and introducing undesirable contaminants. The perimeter retaining ring can also be mounted without screws, such as by use of key slots requiring insertion and partial rotation to retain the key and opposing grooves having O-rings sized to engage and span the space between grooves.

While the invention has been described with regard to specific embodiments, those skilled in the art will recognize that changes can be made in form and detail without departing from the spirit and scope of the invention.

What is claimed is:

1. A carrier head for a chemical mechanical polishing apparatus, comprising:

a substrate backing member;

a first chamber to provide a first downward pressure on the substrate backing member;

a retaining ring *assembly* to maintain a substrate beneath the substrate backing member during polishing, the retaining ring *assembly* vertically movable relative to the substrate backing member, the retaining ring *assembly* including a [lower portion] *retaining ring* having a bottom surface for contacting a polishing pad during polishing and made of a first material, and [an upper portion] *a backing ring* made of a second, different material; and a second chamber *for containing a pressurized gas* to provide a second independently controllable downward pressure on the retaining ring *assembly that depends on gas pressure in the second chamber, wherein the second chamber is pressurizable independently of the first chamber and inflation of the second chamber urges the retaining ring downwardly*.

2. The carrier head of claim 1, wherein the [lower portion] *retaining ring* is thicker than [a] *the* substrate to be polished.

3. The carrier head of claim 1, wherein the [upper and lower portions] *retaining ring and backing ring* are substantially annular in shape.

4. The carrier head of claim 1, wherein the first material is a plastic.

5. The carrier head of claim [1] *4*, wherein the first material is Delrin® *plastic*.

6. The carrier head of claim 1, wherein the second material is a metal.

7. The carrier head of claim 6, wherein the second material is aluminum.

8. The carrier head of claim 1, wherein the [lower portion] *retaining ring* is secured to the [upper portion] *backing ring* by screws.

[9. The carrier head of claim 8, wherein the lower portion is secured to the upper portion by a key and key slot arrangement.]

10. The carrier head of claim 1, wherein the [upper portion] *backing ring* is thicker than the [lower portion] *retaining ring*.

11. The carrier head of claim 1, further comprising a housing, and wherein the substrate backing member is movable relative to the housing.

12. The carrier head of claim 11, wherein the retaining ring *assembly* is movable relative to the housing.

13. A chemical mechanical polishing system, comprising:

a rotatable polishing pad;

a slurry supply to dispense a slurry onto the polishing pad; and a carrier head having a substrate backing member *with a mounting surface*, a first chamber to provide a first downward pressure on the substrate backing member, a retaining ring *assembly* to maintain a substrate beneath the mounting surface during polishing, the retaining ring *assembly* vertically movable relative to the substrate backing member, the retaining ring *assembly* including a [lower portion] *retaining ring* having a bottom surface for contacting a polishing pad during polishing and made of a first material, and [an upper portion] *backing ring* made of a second, different material, and a second chamber *for containing a pressurized gas* to provide a second independently controllable downward pressure on the retaining ring *assembly that depends on gas pressure in the second chamber, wherein the second chamber is pressurizable independently of the first chamber and inflation of the second chamber urges the retaining ring downwardly*.

*14. The carrier head of claim 1, wherein the retaining ring has a top surface and through-holes formed from the top surface to the bottom surface.*

*15. The carrier head of claim 14, wherein the backing ring has a bottom surface with holes formed therein.*

*16. The carrier head of claim 1, wherein the backing ring includes an outwardly extending flange.*

*17. The carrier head of claim 1, wherein the backing ring includes an inwardly extending flange.*

*18. The system of claim 13, wherein the first material is a plastic.*

*19. The system of claim 18, wherein the first material is Delrin® plastic.*

*20. The system of claim 13, wherein the second material is a metal.*

*21. The system of claim 20, wherein the second material is aluminum.*

*22. The system head of claim 13, wherein the retaining ring is secured to the backing ring by screws.*

*23. The carrier head of claim 1, wherein the second chamber is in an inflatable bladder.*

*24. The system of claim 13, wherein the second chamber is in an inflatable bladder.*

*25. The carrier head of claim 1, further comprising a support plate and a gas supply passage through the support plate to supply the pressurized gas to the second chamber.*

*26. The system of claim 13, wherein the carrier head has a support plate and a gas supply passage through the support plate to supply the pressurized gas to the second chamber.*

* * * * *